US008025977B2

(12) United States Patent
Loretti et al.

(10) Patent No.: US 8,025,977 B2
(45) Date of Patent: Sep. 27, 2011

(54) MULTILAYER FILM

(75) Inventors: Maurice Loretti, Chatelaine (CH); Raoul Chattot, Echallens (CH); Savka Djokic, Lausanne (CH)

(73) Assignee: B. Braun Melsungen AG, Melsungen (DE)

( * ) Notice: Subject to any disclaimer, the term of this patent is extended or adjusted under 35 U.S.C. 154(b) by 1017 days.

(21) Appl. No.: 10/562,368

(22) PCT Filed: Jul. 2, 2004

(86) PCT No.: PCT/EP2004/007215
§ 371 (c)(1),
(2), (4) Date: Jun. 8, 2006

(87) PCT Pub. No.: WO2005/002847
PCT Pub. Date: Jan. 13, 2005

(65) Prior Publication Data
US 2007/0048510 A1    Mar. 1, 2007

(30) Foreign Application Priority Data
Jul. 3, 2003    (EP) .................................... 03015046

(51) Int. Cl.
*B32B 27/32*    (2006.01)
*B32B 17/10*    (2006.01)
*B32B 27/00*    (2006.01)
*B32B 27/08*    (2006.01)
*G11B 11/105*    (2006.01)

(52) U.S. Cl. ........ 428/500; 428/220; 428/332; 428/333; 428/334; 428/335; 428/336; 428/337; 428/339; 428/515; 428/516

(58) Field of Classification Search .......... None
See application file for complete search history.

(56) References Cited

U.S. PATENT DOCUMENTS
5,164,258 A    11/1992   Shida et al.
6,133,361 A    10/2000   Hatakeyama et al.

FOREIGN PATENT DOCUMENTS
EP    0459357 A2    12/1991
EP    0774348 A2    5/1997
EP    0965443 A1    12/1999
WO    WO97/37628    10/1997
WO    WO01/01775 A1    1/2001

OTHER PUBLICATIONS

Acierno et al., "Dal Processo Al Prodotto, " *Italia Imballaggio*, Jun. 2000, 8 pages, www.italiaimballaggio.it/italiaimballaggio/06_00/6_00/sezioni/05_matir/art1_matir.html, printed Sep. 27, 2004.
PCT International Search Report mailed Oct. 12, 2004 from corresponding PCT application No. PCT/EP2004/007215 filed Jul. 2, 2004 (5 pgs.).
PCT International Preliminary Report on Patentability mailed Sep. 9, 2005 from corresponding PCT application No. PCT/EP2004/007215 filed Jul. 2, 2004 (9 pgs.).
PCT Written Opinion of the International Preliminary Examining Authority mailed Jun. 29, 2005 from corresponding PCT application No. PCT/EP2004/007215 filed Jul. 2, 2004 (6 pgs.).
PCT Written Opinion of the International Searching Authority mailed Oct. 12, 2004 from corresponding PCT application No. PCT/EP2004/007215 filed Jul. 2, 2004 (7 pgs.).

*Primary Examiner* — Sheeba Ahmed
(74) *Attorney, Agent, or Firm* — Klein, O'Neill & Singh, LLP

(57) ABSTRACT

The present invention relates to a sterilizable multilayer film for containers containing solutions, suspensions, solids or mixtures for parenteral or enteral nutrition or tube feeding, optionally in a spatially separated arrangement of the contents, having a three-layered structure with an inner layer being in contact with the content of the container, an intermediate layer and an outer layer facing the environment, said layers optionally connected by tie and/or adhesive layers, wherein the oxygen transmission rate at 23° C. through the multilayer film determined by the oxygen transmission of the intermediate layer is less than 0.7 ml/m²d, said inner layer having a thickness of from 30 to 120 μm, said intermediate layer having a thickness of from 5 to 35 μm and said outer layer having a thickness of from 20 to 40 μm, and allowing desorption of water absorbed in the intermediate layer during sterilization after said sterilization at 121° C.

21 Claims, 4 Drawing Sheets

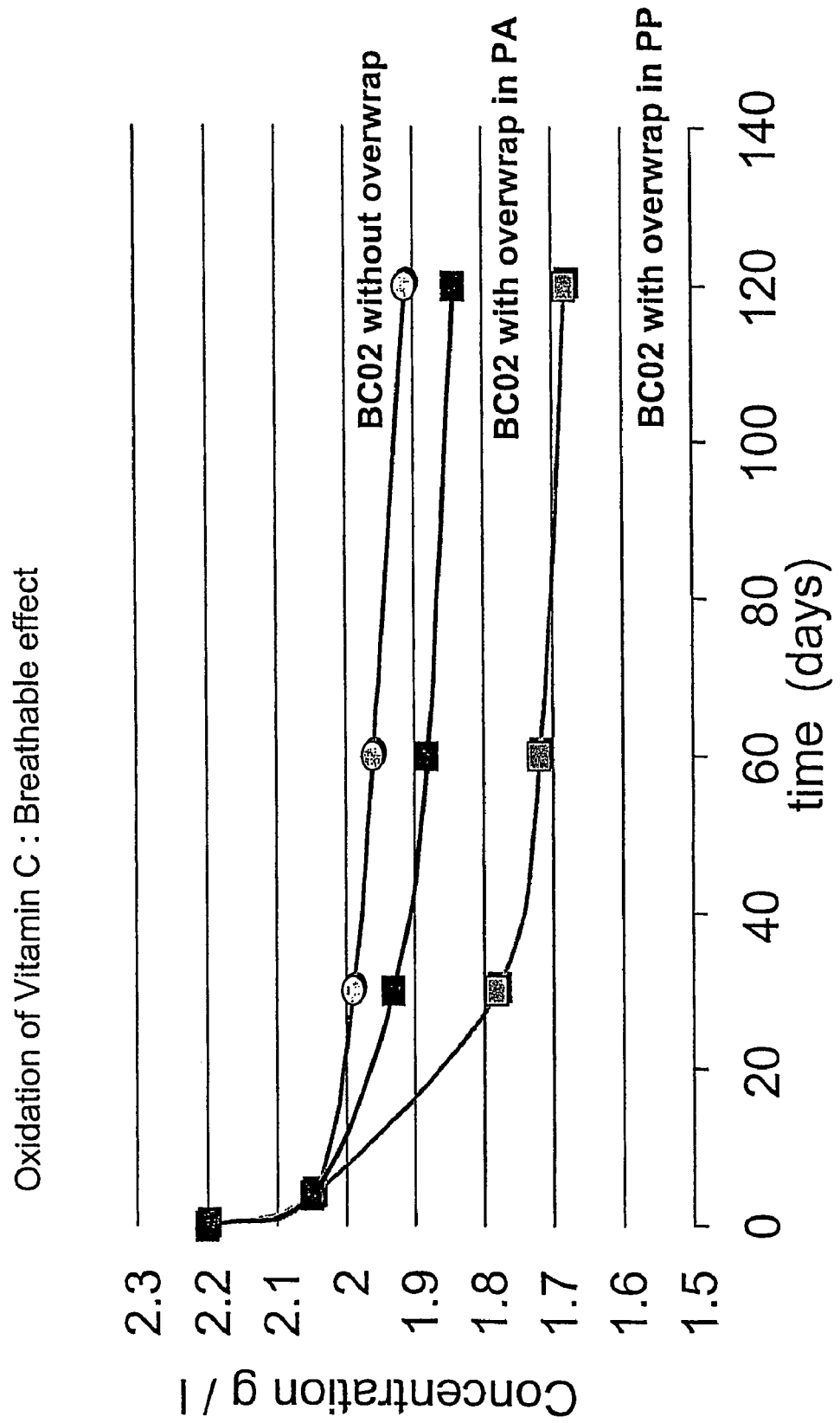

MULTILAYER FILM

Figure 1:
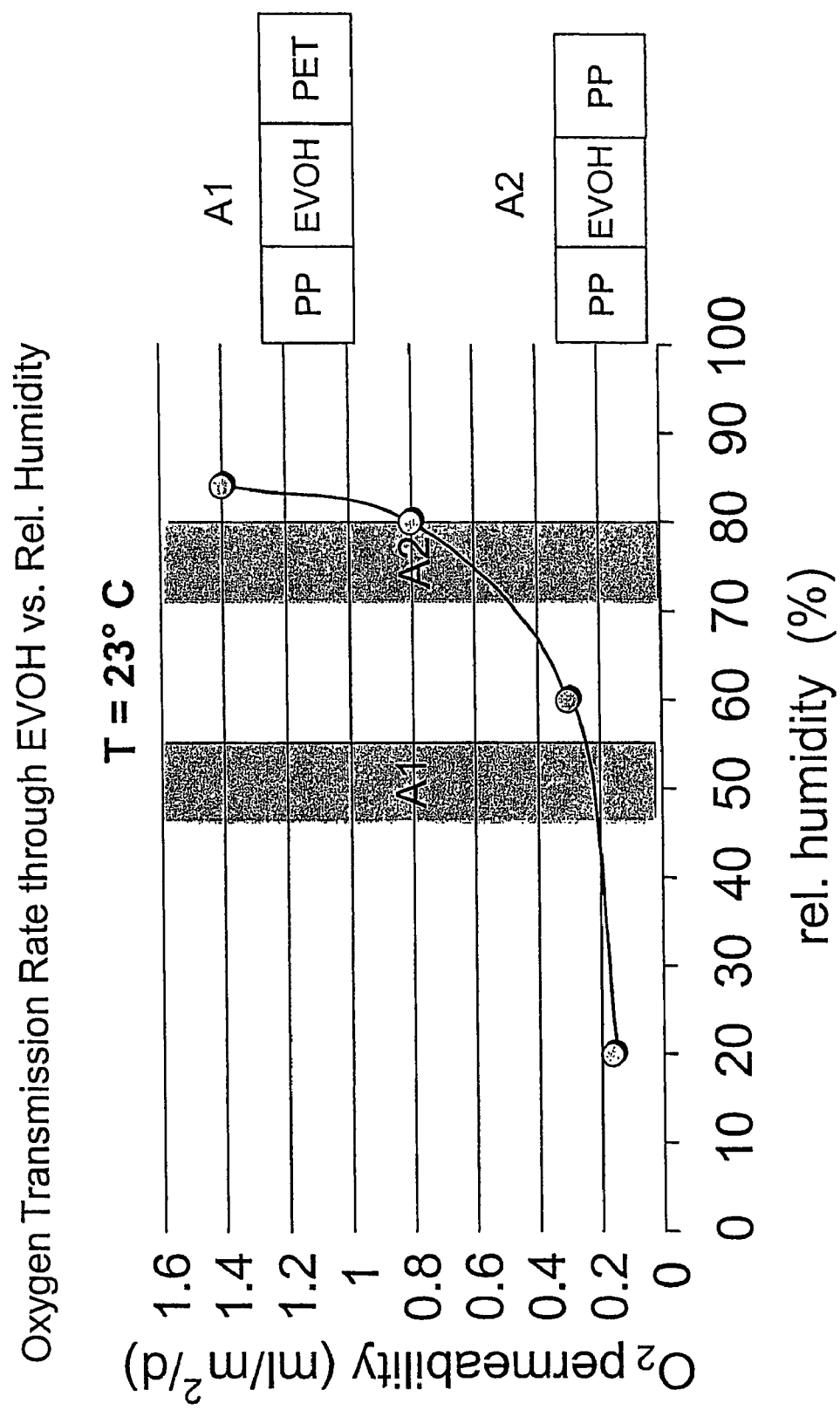

The present invention relates to a multilayer film for containers, containing solutions, suspensions, solids or mixtures for parenteral or enteral nutrition or tube feeding.

Solutions, suspensions, solids or mixtures for parenteral or enteral nutrition or tube feeding are usually filled into various kinds of containers under sterile conditions according to the prior art. These containers include glass bottles, plastic bottles and plastic bags. Plastic bags find widespread use in the prior art.

The individual contents are partly premixed and partly present in spatially separated arrangements so that mixing of the contents is frequently only performed immediately prior to use at the bedside of the patient.

Those bags contain removal means for removing the contents under conditions as sterile as possible.

Thus, an outer packing or envelope of poly(vinylidene chloride) copolymers (PVDC) has become established in the prior art which is not suitable, however, to ensure sterility of the bag surface and of the removal means. One drawback of the use of poly(vinylidene chloride) is, however, the ecologically incompatible chlorine content of the poly(vinylidene chloride) copolymer which, in addition, cannot be sterilized with usual methods. However, the excellent permeabilities to gas, water vapor, flavors and lipids under dry and moist conditions have outweighed the recycling problems in the past.

In the prior art, other materials are known for corresponding barrier layers (barrier polymers). Thus, in Ullmann's Encyclopaedia of Industrial Chemistry, 5th edition, Volume 11, Section 6.5.10, poly(vinyl alcohol) (PVOH) and ethylene/vinyl alcohol (EVOH) copolymer is also described as barrier layers in addition to PVDC.

In ethylene/vinyl alcohol copolymers, the moisture sensitivity of the poly(vinyl alcohol) is reduced by the copolymerization with ethylene. The usual vinyl alcohol content is from 60 to 82%, corresponding to an ethylene content of 18 to 40%. In Section 6.5.12, polymer composites are described. Since, for many applications, one single layer of a polymer fails to meet the requirements of the good to be packed inter alia, the coextrusion of different polymers is described in order to improve, for example, the thermal properties or the barrier properties.

WO 95/27268 describes a multilayer composite sheet comprising at least one layer sequence which includes a heterophase polypropylene (co)polymer/bonding layer/EVOH/bonding layer/polyolefin layer, the heterophase polypropylene (co)polymer consisting of a homopolymer of propylene or a copolymer of propylene with ethylene and/or an α-olefin.

EP 0 774 348 A2 relates to a sterilizable tubular film for use as outer packaging for medical solutions etc. Sterilizable co-extruded tubular film made of polymer composite, for wrapping containers for solutions, suspensions, solids or mixtures for parenteral, enteral or stomach tube feeding, optionally with contents in separated compartments are described. The tube consists of three layers as follows: (a) polypropylene homopolymer (homo-PP), (b) EVOH copolymer with an ethylene content of 27 to 38 mol.-% and (c) a single-phase PP homo- or copolymer which is suitable as the insides of a bag for the inner container. Also claimed is (I) production of this tubular film by co-extrusion; and (ii) peelable, sterilized packs for containers, made from this film. Preferably layers (a), (b) and (c) have thicknesses of 20-40 (preferably 25-35), 15-35 (preferably 20-30) and 30-50 (preferably 35-45) μm respectively. Said EVOH copolymer (b) preferably has an ethylene content of 29-32 mol.-%, and the PP copolymer is a copolymer of propylene and ethylene.

EP 0 353 193 B1 describes a multilayer sheet material of a foil made of a polyamide 11, i.e. the polyamide of the 11-aminoundecanoic acid which is bonded by at least one of its surfaces to a film of polypropylene. The material is obtained by co-extrusion of said polyamide and polypropylene.

EP 0 965 443 A1 discloses a sterilizable co-extruded polymer composite tubular film for use as containers for solutions; suspensions, solids or mixtures for parenteral or enteral nutrition or tube feeding, optionally in specially separated arrangement of the contents, having a three-layer-structure of the tubular film with the following layer sequence:
a) polyamide 11 and/or polyether blockamide;
b) ethylene/vinyl alcohol copolymer with an ethylene content of 27 to 38 mol.-%, and
c) homophase polypropylene copolymer which is suitable for forming the interior surface of the container.

Preferably, layer a) has a thickness of 40 to 100 μm (especially from 45 to 75 μm), layer b) 5 to 35 μm (especially 10 to 30 μm) and layer c) 60 to 100 μm (especially 65 to 85 μm).

Basic requirements for a plastic bag system for the pharma industry, especially for the use as containers for infusion products, PVR, dialysis, urology, or clinical nutrition products include minimized drugs absorption on the interior side, minimized water loss of the contents through the plastic film, sterilizability of contents and container/film material as well as maximized protection of the contents against oxidation by environmental oxygen.

Physical phenomena that have thus to be considered in the development of plastic films for containers are accordingly adsorption of water and/or drugs from the contents of the container into the interior part of the film, migration of the solution into the film, migration of polymer and/or constituents of the polymer into the solution, permeation of water from the interior side into the environment and vice versa, especially during sterilization, permeation of oxygen from the environment into the solution and desorption of solvent and/or water from the outer part (exterior side) of the film into the environment.

These phenomena largely determine the shelf-life of the product being a raw sterilized solution or a drug admixture ready to use. Plastic films used in the pharma industry usually show little or no water adsorption from the environment and the contained solution at 23° C. before sterilization. During sterilization at 121° C., the films adsorb significant amounts of water both from the environment and the solution by which oxygen permeability of the film is dramatically increased.

In the prior art of parenteral nutrition, oxygen absorbers have been widely employed to date in order to protect the contents from oxygen. Under the trademark <<Ageless>>, for example, an absorbent material based on iron salts is commercially available which, in addition to a reduction of the oxygen content, lowers the hydrogen sulfide content derived from sulfur-containing ingredients in usual sterilization methods. Said absorber is used in the prior art when overpacking the container with an additional envelope.

EP 1 270 206 A1 describes an oxygen-absorbing multilayer-film which comprises an outer layer comprising a thermoplastic resin; an adhesive layer comprising an epoxy resin composition; an oxygen-absorbing layer comprising a thermoplastic resin and an iron-based oxygen-absorbing agent incorporated therein; and a heat sealing layer comprising an oxygen-permeable thermoplastic resin, wherein said adhesive layer comprises a multi-component gas barrier epoxy resin composition containing at least 30% by weight of a xylylene diamine unit. Exemplified multilayer-films according to EP 1 270 206 A1 include at least one additional layer, the thermoplastic resin of the oxygen-absorbing layer being preferably chosen from a group of thermoplastics with low oxygen barrier properties. Furthermore, as the oxygen barrier material is used as the laminating adhesive the multilayer structures according to EP 1 270 206 A1 do not allow desorption of water absorbed in the intermediate layer during sterilization. EP 1 270 206 A1 does not disclose a three layer structure in which the intermediate layer rather than an adhesive layer functions as a gas barrier.

WO 99/02419 discloses a multilayer liner sheet wherein the outer layers are skin layers formed of a gas permeable material which enclose a gas barrier layer, i.a. preferably made of EVOH. The layer facing the contents may optionally be made of polypropylene, and the multilayer film contains an oxygen absorbing inner layer, preferably including Fe-salts. This document mentions PET as film forming material.

EP 0 884 173 A2 discloses a multilayer film having oxygen absorbing and gas barrier properties wherein the absorber is on the basis of iron, being contained in a layer closer to the interior than the gas barrier layer, the layer facing the interior side is preferably a polyolefin layer and the outer "protective" layer may optionally comprise either or both of a polyamide protective layer and a PET protective layer. For the gas barrier layer, various materials fulfilling the requirement of an oxygen permeability of less than 100 cm$^3$/m$^2$×day×atm (23° C., RH=100%) are mentioned, e.g. EVOH copolymers.

WO 96/18685 discloses multilayer container structures including an oxygen scavenging composition with an oxygen barrier material and optionally adjacent (intermediate) PET cores. In this case PET acts as the core or body material of the container and cannot serve as a breathable layer.

EP 0 083 826 B1 discloses oxygen absorbing structures in the form of laminated multilayer films having an EVOH layer as oxygen barrier laminated to a layer containing oxygen absorbing material followed by an inner layer made of e.g. polypropylene. This multilayer film necessarily has an inner and outer layer of the same material.

WO 01/29116 A1 discloses multilayer films similar to the films of EP 0 083 862 B1 with the exception that quinones are described as oxygen absorbing material.

A multilayer film with oxygen absorbing property based on incorporation of quinones is also described in WO 01/88023 A1. This multilayer film comprises an EVOH layer as gas barrier.

Oxygen absorbing multilayer films containing iron based oxygen absorbing material are furthermore disclosed in EP 0 781 649 A2, EP 0 812 677 A1 and EP 0 852 206 B1.

WO 01/36518 A1 discloses multilayer thermoplastic films including a layer that comprises at least one or more absorbers exemplified by special zeolithes. Gastight laminating films are described in U.S. Pat. No. 6,534,171 B1 which may contain conventional additives such as solid inorganic particles.

Similarly, DE 43 42 618 A1, U.S. Pat. No. 6,517,920 B1 and U.S. Pat. No. 6,541,087 B1 which disclose multilayer films with oxygen barrier property contain inorganic pigments such as iron oxides.

Thus, the object of the present invention is to provide an improved and simplified sterilizable multilayer film for containers containing solutions, suspensions, solids or mixtures for parenteral or enteral nutrition or tube feeding, optionally in a specially separated arrangement of the contents, which is suitable to lastingly protect the contents from environmental oxygen and guarantees low absorption of water and drugs and at the same time preserves the advantageous mechanical properties and processibility of multilayer-films with a low number of layers, e.g. flexibility, strength and economy.

According to the invention, the above object is achieved by a sterilizable multilayer film for containers containing solutions, suspensions, solids or mixtures for parenteral or enteral nutrition or tube feeding, optionally in a spatially separated arrangement of the contents, having a three-layered structure with an inner layer being in contact with the content of the container, an intermediate layer and an outer layer facing the environment, said layers optionally connected by tie and/or adhesive layers, wherein the oxygen transmission rate at 23° C. through the multilayer film determined by the oxygen transmission of the intermediate layer is less than 0.7 ml/m$^2$d, said inner layer having a thickness of from 30 to 120 µm, said intermediate layer having a thickness of from 5 to 35 µm and said outer layer having a thickness of from 20 to 40 µm, and allowing desorption of water absorbed in the intermediate layer during sterilization after said sterilization at 121° C.

While according to the present invention the material of the intermediate layer determines the oxygen transmission rate through the multilayer film, the inner and the outer layer show significantly high oxygen permeability. It is thus preferred that said intermediate layer constitutes the major oxygen barrier of the multilayer film.

It has been found that common EVOH layers during sterilization at 121° C. absorb a serious amount of water. According to the present invention the presence of an outer layer, which allows desorption of water absorbed by the intermediate layer during the sterilization process helps to reduce the specific humidity of the intermediate layer and thus, improves the oxygen barrier function of the film by significantly reducing the oxygen permeability of the intermediate layer. A specific humidity of the intermediate layer after storing the multilayer film in an environment having a relative humidity for example of 70% at 23° C. results in an oxygen transmission rate at 23° C. through the multilayer film of less than 0.7 ml/m$^2$d. This relation between specific humidity of the intermediate layer, oxygen transmission rate through the multilayer film and the anti-aging effect on the contents of the container has never been disclosed nor considered in the prior art.

FIG. 1 illustrates the relation between oxygen permeability and relative humidity of the environment of a multilayer film according to the present invention. From the figure it can be seen that a multilayer film comprising an inner layer made of polypropylene (PP), an intermediate layer made of EVOH and an outer layer made of polyethylene terephthalate (PET) fulfills the requirements of the invention (multilayer film A1). The specific humidity of its intermediate EVOH-layer corresponds to around 50% relative humidity of the environment and it exhibits an oxygen permeability at 23° C. of less than 0.4 ml/m$^2$d. On the contrary, multilayer film A2 as a comparative example, differing from A1 in that the outer layer consists of PP allows desorption of water to a significantly less extent. The specific humidity of the intermediate layer corresponds to close to 80% relative humidity, and oxygen permeability at 23° C. is significantly greater than 0.7 ml/m$^2$d.

In a preferred embodiment the oxygen transmission rate at 23° C. through the multilayer film is less than 0.4 ml/m$^2$d. Said preferred rate can be achieved by allowing to reduce the specific humidity of the intermediate layer.

The inner layer of the multilayer film according to the invention preferably essentially consists of non-polar polymeric material. This layer forms the interior surface of the container and thus is in direct contact with the content. In this case too, it is necessary to provide a material having a high softening point which is above the usual sterilization temperatures. Said inner layer additionally has the function of a (water) barrier for protecting the intermediate layer from water of the content of the container. This layer, comprising or preferably substantially consisting of polypropylene homopolymer and/or polypropylene copolymer, also protects said intermediate layer, particularly a ethylene vinyl alcohol fraction from moisture, and confers the desired mechanical stability to the overall structure.

If polypropylene copolymers are used, in addition to the propylene component, the random copolymer may contain ethylene, which in particular can be contained in the copolymers in amounts of 2 to 5% by weight.

Figure 2:
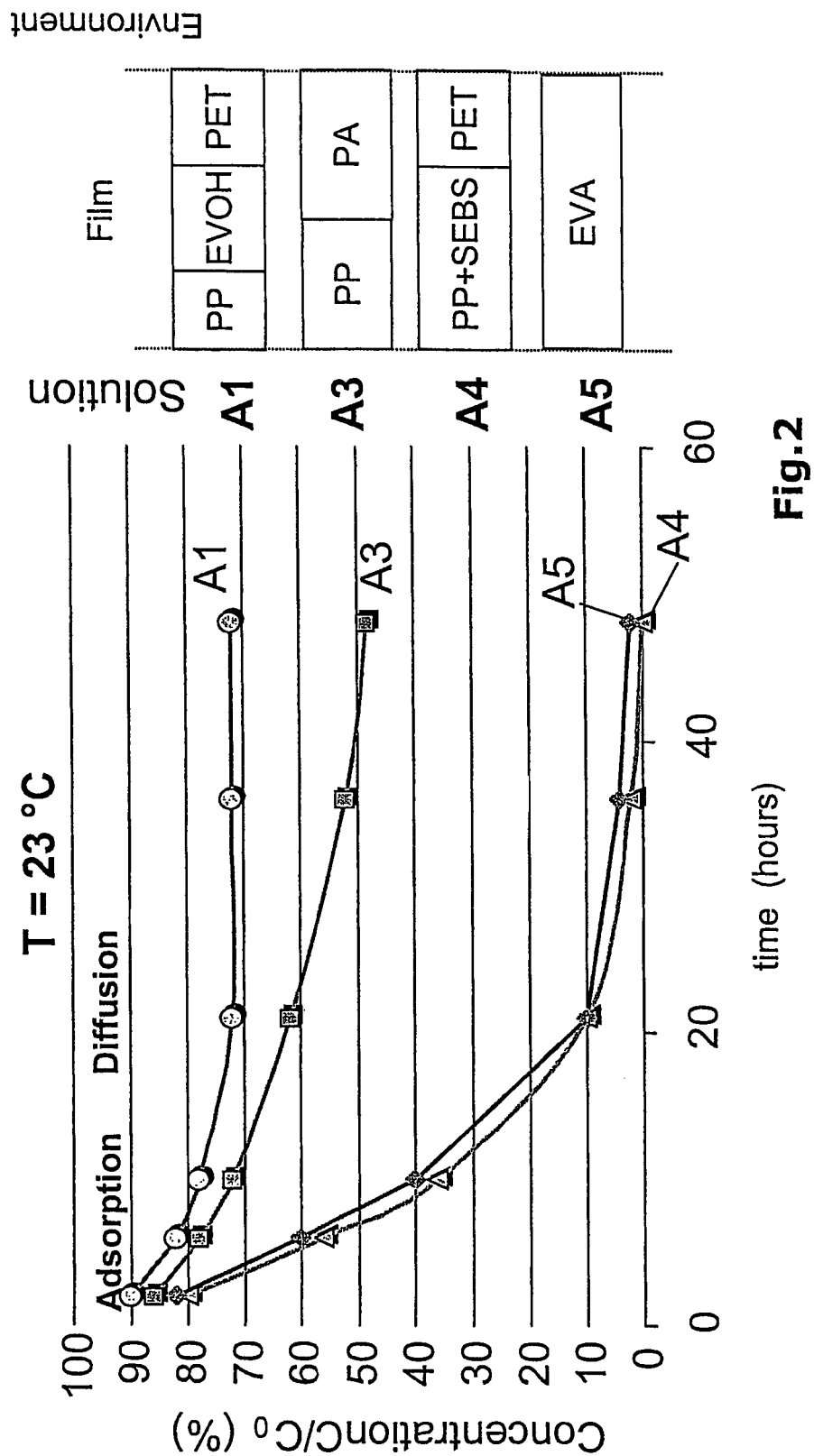

FIG. 2 shows the results of a short term experiment (50 hours at 23° C.), starting with solutions of ascorbic acid (50 mg/l), a hydrosoluble vitamin, of equal starting concentrations ($c_0$) in bags made of different plastic films (A1, A3, A4 and A5), monitoring the concentration of ascorbic acid in the solution against time. Composite plastic film A1 comprising an inner layer made of PP, an intermediate layer made of EVOH and an outer layer made of PET served best in preserving high concentrations of ascorbic acid which remained stable after an initial period of absorption at a level well above 70% of $c_0$. Multilayer film A3 differed from A1 in that no intermediate layer is present and the outer layer consists of polyamide (PA). Its preserving performance was still acceptable, though significantly lower. After 50 hours the remaining concentration of ascorbic acid was lower but close to, 50% of $c_0$. Plastic films A4 and A5 exposed more or less polar material to the contents of the solution. A4 had an inner layer made of PP and SEBS and an outer layer made of PET, while A5 was a uniform film made of EVA. These plastic films showed high absorption rates, and the concentration of ascorbic acid in the solution was reduced to practically zero within 50 hours. The experiments illustrate the superior effect of an inner layer made of non-polar material due to lower absorption of the drugs out of the solution. This effect is furthermore improved by a multilayer structure according to the present invention, as exemplified by multilayer film A1. After the drug admixture to the basic solution, absorption of the drug to the interior surface of the container film can be an important determinant of the effectiveness of a medical solution. Inner layers manufactured from PVC, EVA and PP+SEBS or other polar material exhibit high absorption while inner layers formed from PP or PE and/or the like show low drugs absorbency out of the solution, in accordance with a preferred embodiment of the invention.

For the development of an optimal film the whole production history including sterilization has to be taken into account. The composition of the inner layer of a primary packaging film determines the efficiency of a drug delivered to the patient.

The intermediate layer of the multilayer film according to the invention preferably comprises or substantially consists of an ethylene/vinyl alcohol copolymer layer with a defined ethylene content of 27 to 38 mol.-%.

Namely, if the ethylene content is chosen too high, the intermediate layer is destroyed in the usual steam sterilization and looses its gas barrier properties, particularly its oxygen barrier properties, so that the object of the invention cannot be achieved satisfactorily.

Experiments have shown that the desired product properties are particularly pronounced at an ethylene content of 29 to 32 mol.-%. Therefore, it is particularly preferred according to the present invention to adjust the ethylene content of the intermediate layer within the range of 29 to 32 mol.-%, since this results in a particularly low gas permeability, especially oxygen permeability. In addition, the sterilizability and the core layer stability of the layer structure according to the invention is particularly pronounced within this range of values.

The intermediate layer may be co-extruded with the outer layer. This outer layer protects the material of the intermediate layer, e.g. ethylene/vinyl alcohol, from moisture and confers the necessary thermal stability to the overall structure due to the high softening point of the polymer which is to be selected above the usual sterilization temperatures.

According to the invention, when a container is sterilized, the outer layer must permit to evaporate residual humidity which has been Introduced into the multilayer structure and therefore humidifies the intermediate layer. Preferred in the sense of the invention is an outer layer comprising or substantially consisting of polyethylene terephthalate homopolymer and/or polyethylene terephthalate copolymers. Useful copolymers are commercially available such as Ecdel® type, from Eastman Chemical or Hytrel® type from DuPont.

These breathable materials are particularly suitable to fulfill the requirements of the present invention.

Preservation of sensitive ingredients of the contents of a container according to the invention is particularly optimized by an EVOH layer structure as the intermediate layer of the multilayer film combined with an outer layer consisting of a preferable material like PET. This combination particularly minimizes the oxidation of the ingredients by environmental oxygen.

Figure 3:
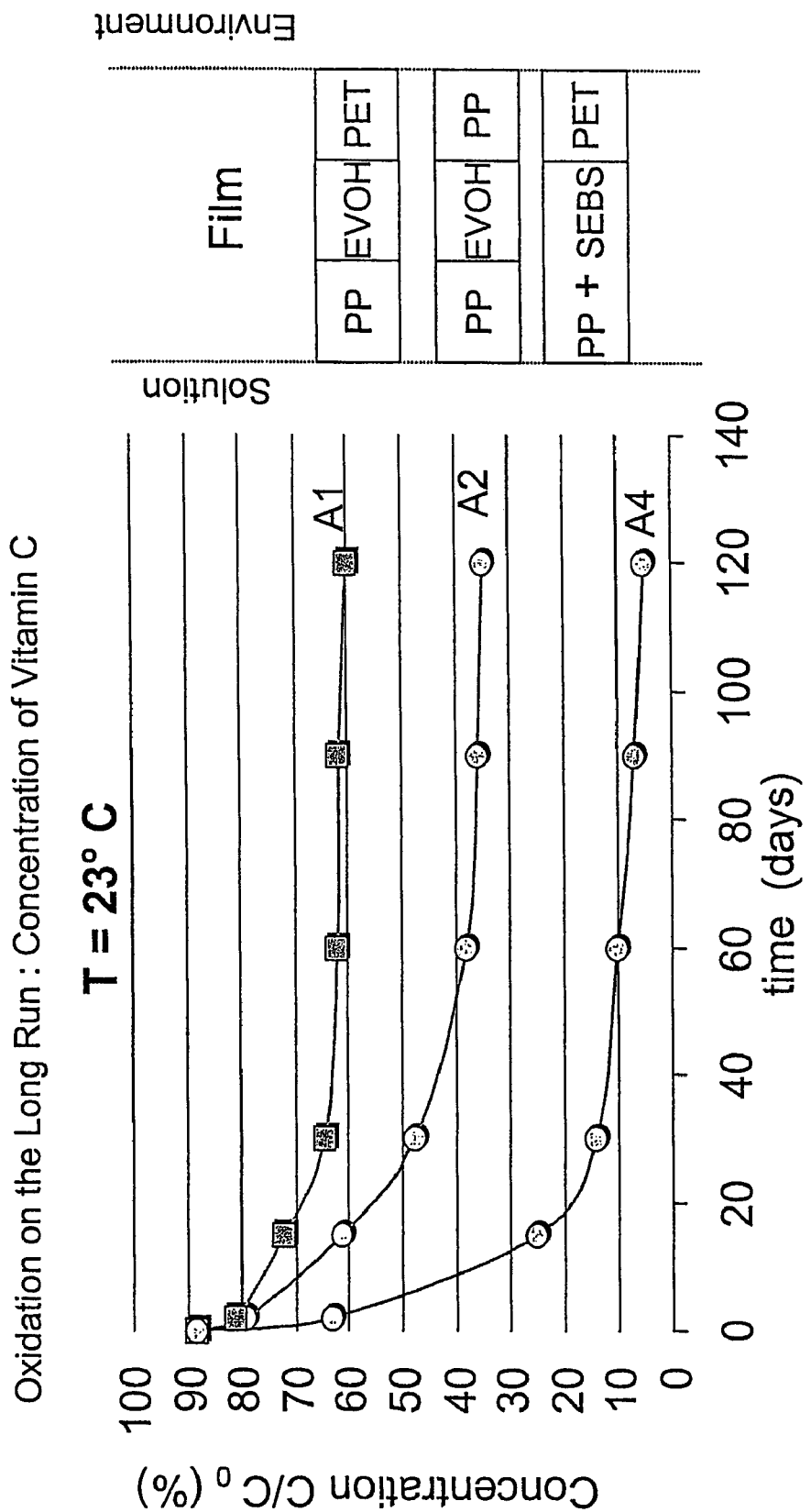

FIG. 3 gives the results of a long-term comparative experiment illustrating the oxidation of solutions of high concentrated (approx. 2.2 g/l) vitamin C at 23° C. in containers made of different multilayer films (A1, A2 and A4 as described above). Starting with equal starting concentrations $c_0$, the solution contained in a plastic bag made of a multilayer film according to the invention (A1: inner layer PP, intermediate layer EVOH, outer layer PET) preserved 60% of $c_0$ of vitamin C even after a period of 120 days at 23° C. At this time, the solution contained in a bag of a multilayer film (A2), differing from A1 in that the outer layer was made of PP instead of PET, thereby being less effective in desorption of water, contained but 35% of $c_0$ of vitamin C. A solution contained in a plastic bag of a film without the intermediate layer, consisting of an inner layer made of PP and SEBS and an outer layer made of PET (A4) had lost practically all of its original content of vitamin C during the course of the experiment. The superiority of multilayer films according to the invention in preserving of solutions sensitive to oxidation is thereby illustrated.

The oxygen transition rate of the multilayer film and accordingly that of the intermediate layer depends on the moisture content (specific humidity) inside the resin. Therefore the structure of the outer layer controls the oxygen transmission rate indirectly by its own water vapor transmission rate.

In a preferred embodiment of the invention, the multilayer film contains at least one oxygen absorber within one or several of the layers or in between of at least two layers. Thereby the drug preserving properties of the multilayer film are significantly further enhanced. Multi-compartment medical bags, particularly three- or more compartment bags with excellent preserving quality are provided using the multilayer film of the invention.

A preferred oxygen absorber according to the invention contains or consists of Fe or Fe(II)-salts, especially Ageless®, and is particularly useful if it is contained in said inner layer of the multilayer film. This extends the lifetime of the oxygen absorber and reduces any barrier between the absorber and the oxygen sensitive goods to be protected by the multilayer film.

The oxygen absorber may preferably be contained in a tie and/or adhesive layer located between said inner layer and said intermediate layer. Short and long term experiments equivalent to the experiments according to FIGS. 2 and 3 similarly revealed the superior preserving properties of a composite plastic film comprising an inner layer made of PP, an intermediate layer made of EVOH and an outer layer made of PET, while the tie layer between the intermediate and the inner layer contained the oxygen absorber Shelf Plus® from Ciba Specialities.

Best preserving results are obtained if said oxygen absorber is contained in the respective layer/layers of the multilayer film according to the invention in an amount of 1 to 100 mg/g, particularly 5 to 20 mg/g related to the weight of the respective layer or 0.5 to 2.0 mg/g related to the overall weight of all layers.

High integrity and physical requirements will only be fulfilled by multilayer structures due to synergy effects in combination of different layers and the design potential.

The method of choice for the preparation of the multilayer film according to the invention is the per se known method of multilayer coextrusion blowing.

By means of the present invention, it is possible to prepare tubular films and, therefrom, sterilizable containers, especially bags, in a multilayer coextrusion blowing method which enables an ecologically compatible disposal. Besides the common sterilization of the polymer multilayer film forming the container, it is possible to sterilize the container. The bags thus obtained are heat-sealable.

Another aspect of the present invention is the use of the above multilayer film for the preparation of a pharma film, especially for peelable containers for solutions, suspensions, solids or mixtures for parenteral or enteral nutrition or tube feeding, optionally in a spatially separated arrangement of the contents.

Preferred sterilization method is the vapor sterilization at a temperature of 121° C. for a period of time which ensures sterility in steam-type autoclaves or in a water cascade, or the sterilization with ethylene oxide.

The multilayer film material according to the invention is heat-sealable and peelable so that the containers can be prepared with the multilayer film according to the invention, especially by hot-sealing.

Accordingly, another aspect of the present invention are peelable, sterilizable containers for solutions, suspensions, solids or mixtures for parenteral or enteral nutrition or tube feeding, optionally in a spatially separated arrangement of the contents, having a three-layered structure of the multilayer film of the packing.

The multilayer films according to the invention may preferably be used to preserve the quality of products for infusion, plasma volume replacement (PVR), dialysis, urology and/or clinical nutrition. They may in particular be used to minimize oxidation and/or absorption of the ingredients of said products.

EXAMPLES

Multilayer films according to Table 1 and 2 have been investigated.

TABLE 1

|  | Example 1 | Comparative Example 1 | Comparative Example 2 |
|---|---|---|---|
| Constitution | COPET<br>Tie Layer<br>EVOH 32<br>Tie Layer<br>PPS + PPC | PA11<br>Tie Layer<br>PP Copo | COPET<br>Tie Layer<br>PP Copo + SEBS |
| Water permeability | 0.48 g/m$^2$/d at 23° Δ 85% RH | 0.25 g/m$^2$/d at 23° Δ 85% RH | 0.48 g/m$^2$/d at 23° Δ 85% RH |
| Gas permeability O$_2$ | 0.6 ml/m$^2$/d at 25° C./0% RH | 150 ml/m$^2$/d at 25° C./0% RH | 1475 ml/m$^2$/d at 25° C./0% RH |
| General properties | soft film/sterilizable at 125° C. | stiff film/sterilizable at 125° C. | soft film/sterilizable at 121° C. |
| Transparency | 25 Haze | 35 Haze | 6 Haze |

TABLE 2

|  | Example 2 | Comparative Example 3 |
|---|---|---|
| Constitution | COPET<br>Tie Layer<br>EVOH 32<br>Tie Layer*<br>PPS + PPC<br>*: including an absorber Shelf Plus® | PP<br>Tie Layer*<br>PP Copo<br>Tie Layer PPC<br>*: not including an absorber |
| Water permeability | 0.48 g/m$^2$/d at 23° Δ 85% RH | 0.25 g/m$^2$/d at 23° Δ 85% RH |
| Gas permeability O$_2$ | 0.6 ml/m$^2$/d at 25° C./0% RH | 150 ml/m$^2$/d at 25° C./0% RH |
| General properties | soft film/sterilizable at 125° C. | stiff film/sterilizable at 125° C. |
| Transparency | 20 Haze | 40 Haze |

Examples 1 and 2

Film (Blown)

| | | |
|---|---|---|
| 40 μm | COPET | Ecdel ® 9967 |
| 13 μm | Tie Layer | Bynel ® XB787/<br>Admer NF 911E |
| 15 μm | EVOH 32 | Eval ® F171B or<br>Soarnol ® DC3202F |
| 13 μm | Tie Layer | Bynel ® 50E739/Orevac ®<br>ppc; Example 2: including<br>10 mg/g<br>Shelf Plus ® |
| X<br>Y; X + Y = 100 μm | PP modified<br>PP copo | Adflex ® 7392XEP 25%<br>PPR 3022 SM3 75% |

In the examples 1 and 2, said tie layers serve as stickers responsible for adhesion of the outer, intermediate and inner layer to each other. While the outer layer is mainly responsible for the breathable effect and the intermediate layer mainly acts as a gas barrier, the inner layer provides softness and barrier against leaching and water vapor transmission.

The importance and surprising significance of the breathable effect of the outer layer according to the present invention is illustrated by a comparative study exemplified in FIG. 4. The vitamin C concentration after sterilization in a container according to example 1 was maintained to a much better extent even without any overwrap in PA or even more in PP. After 120 days at 23° C. starting with a vitamin C concentration of 2.5 g/l, the solution contained in a bag made of a multilayer film according to example 1 still contained more than 1.9 g/l of vitamin C. The identical solution, in the identical bag, provided with an overwrap made of PA contained but less than 1.85 g/l of vitamin C after 120 days at 23° C., while an overwrap made of PP resulted in an even lower concentration (less than 1.7 g/l) of vitamin C after 120 days at 23° C. This is due to the fact that the properties are lowered if an overwrap with lower permeability characteristics keeps the container separated from the environment. Accordingly, the absence of an overwrap is especially preferred according to the present invention.

The invention claimed is:

1. Sterilizable multilayer film for containers containing solutions, suspensions, solids or mixtures for parenteral or enteral nutrition or tube feeding, optionally in a spatially separated arrangement of the contents, having a three-layered structure with an inner layer being in contact with the content of the container, an intermediate layer and an outer layer facing the environment, said layers optionally connected by tie and/or adhesive layers; wherein:
   the oxygen transmission rate at 23° C. through the multilayer film determined by the oxygen transmission of the intermediate layer is less than 0.7 ml/m²d;
   said inner layer having a thickness of from 30 to 120 μm;
   said intermediate layer having a thickness of from 5 to 35 μM and said outer layer having a thickness of from 20 to 40 μm; and
   allowing desorption of water absorbed in the intermediate layer during sterilization after said sterilization at 121° C.

2. The multilayer film according to claim 1, wherein said oxygen transmission rate at 23° C. is less than 0.4 ml/m²d.

3. The multilayer film according to claim 1, having an inner layer essentially consisting of non-polar polymeric material.

4. The multilayer film according to claim 3, having an inner layer comprising polypropylene homopolymer and/or polypropylene copolymer.

5. The multilayer film according to claim 1, having an intermediate layer comprising ethylene/vinyl alcohol copolymer, having a defined ethylene content of 27 to 38 mol %.

6. The multilayer film according to claim 1, having an outer layer comprising polyethylene terephthalate homopolymer and/or polyethylene terephthalate copolymer.

7. The multilayer film according to claim 1, characterized in that the multilayer film contains at least one oxygen absorber within one or several of the layers.

8. The multilayer film according to claim 7, wherein said oxygen absorber contains Fe or Fe(II)-salts.

9. The multilayer film according to claim 7, wherein said oxygen absorber is contained in said inner layer.

10. The multilayer film according to claim 7, wherein said oxygen absorber is contained in a tie and/or adhesive layer located between said inner layer and said intermediate layer.

11. The multilayer film according to claim 7, wherein said oxygen absorber is contained in the respective layer/layers in an amount of 1 to 100 mg/g related to the weight of the respective layer.

12. The multilayer film according to claim 7, wherein said oxygen absorber is contained in an amount of 0.5 to 2.0 mg/g related to the overall weight of all layers.

13. Vapor sterilized multilayer film according to claim 1.

14. The multilayer film according to claim 2, having an inner layer essentially consisting of non-polar polymeric material.

15. A multilayer film for containers containing solutions, suspensions, solids or mixtures for parenteral or enteral nutrition or tube feeding, comprising:
   an inner layer consisting essentially of non-polar polymeric material;
   an outer layer facing the environment, said outer layer comprising at least one of polyethylene terephthalate homopolymer and polyethylene terephthalate copolymer; and
   an intermediate layer, interposed between the inner layer and the outer layer, said intermediate layer comprising ethylene/vinyl alcohol copolymer, having a defined ethylene content of 27 to 38 mol %.

16. The multilayer of claim 14 wherein the outer layer has a thickness of from 20 to 40 μm.

17. A method for forming a multilayer film for containers containing solutions, suspensions, solids or mixtures for parenteral or enteral nutrition or tube feeding, having an oxygen transmission rate at 23° C. through the multilayer film of less than 0.7 ml/m²d, the method comprising:
   providing an inner layer, being in contact with the content of the container, having a thickness of from 30 to 120 μm;
   providing an outer layer, facing the environment, having a thickness of from 20 to 40 μm;
   providing an intermediate layer, interposed between the inner layer and the outer layer, having a thickness of from 5 to 35 μm; and
   wherein the outer layer allows desorption of water absorbed in the intermediate layer during sterilization after said sterilization at 121° C.

18. The method of claim 17, wherein the outer layer comprises at least one of polyethylene terephthalate homopolymer and polyethylene terephthalate copolymer.

19. The method of claim 17, wherein the intermediate layer comprises ethylene/vinyl alcohol copolymer, having a defined ethylene content of 27 to 38 mol %.

20. The method of claim 17, wherein the inner layer comprises polypropylene homopolymer and/or polypropylene copolymer.

21. The method of claim 17, further providing at least one oxygen absorber within one or several of the layers.

* * * * *

UNITED STATES PATENT AND TRADEMARK OFFICE
CERTIFICATE OF CORRECTION

PATENT NO.       : 8,025,977 B2                                             Page 1 of 1
APPLICATION NO.  : 10/562368
DATED            : September 27, 2011
INVENTOR(S)      : Maurice Loretti et al.

It is certified that error appears in the above-identified patent and that said Letters Patent is hereby corrected as shown below:

In column 2, line 9, delete "solutions;" and insert -- solutions, --, therefor.

In column 6, line 21, delete "Introduced" and insert -- introduced --, therefor.

In column 9, line 37, in Claim 1, delete "μM" and insert -- μm --, therefor.

Signed and Sealed this
Third Day of April, 2012

David J. Kappos
*Director of the United States Patent and Trademark Office*